United States Patent [19]
Hand et al.

[11] Patent Number: 5,165,107
[45] Date of Patent: Nov. 17, 1992

[54] ELECTRONIC DELAY TIMER AND ALARM SYSTEM

[76] Inventors: Doyle W. Hand; Thomas M. Holt, both of P.O. Box 773, Spearman, Tex. 79081

[21] Appl. No.: 548,274

[22] Filed: Jul. 2, 1990

[51] Int. Cl.⁵ .................................................. G08B 1/00
[52] U.S. Cl. .............................. 340/309.6; 340/309.15; 340/516; 340/527; 340/532; 340/692; 340/329; 340/384 R; 340/679; 361/1; 361/95; 417/12; 417/7; 307/141
[58] Field of Search ........................... 307/141, 141.4; 340/309.15, 309.6, 309.5, 309.4, 328, 329, 384 E, 384 R, 500, 540, 692, 516, 527, 532; 181/103, 107, 18; 252/68; 361/92, 96, 93, 94, 68, 29, 95, 1; 417/12, 43, 7

[56] References Cited

U.S. PATENT DOCUMENTS

| | | | |
|---|---|---|---|
| 1,709,517 | 4/1929 | Billingsley | 340/527 |
| 1,790,681 | 2/1931 | Smith | 340/654 X |
| 2,864,049 | 12/1958 | Sheets | 361/29 X |
| 3,191,114 | 6/1965 | Reed | 361/29 X |
| 3,631,447 | 12/1971 | Sulat et al. | 340/679 X |
| 3,778,809 | 12/1973 | Hawes | 340/309.5 |
| 4,110,742 | 8/1978 | Hawkins | 340/309.1 |
| 4,206,448 | 6/1980 | Davis | 340/384 R |
| 4,266,221 | 5/1981 | Hawkins | 340/309.15 |
| 4,297,678 | 10/1981 | Lee | 340/309.15 |
| 4,821,024 | 4/1989 | Bayha | 340/309.15 X |

Primary Examiner—Donnie L. Crosland
Attorney, Agent, or Firm—Norman B. Rainer

[57] ABSTRACT

A time delay and alarm system is provided to ensure safe operation of periodically activated apparatus having potentially dangerous moving parts. The system preferably employs a 555 type integrated timer circuit, a horn, and a pulse generator which causes the horn to produce a cyclical sound.

4 Claims, 3 Drawing Sheets

ELECTRONIC DELAY TIMER AND ALARM SYSTEM

BACKGROUND OF THE INVENTION

This invention relates to a safety device and more particularly concerns an electronic system which causes an alarm to sound prior to the electrical activation of unattended moving equipment.

It is well known in the oil production industry that many wells containing crude oil most efficiently produce when the pumping apparatus is operated intermittently. The cycle is regulated by a control timer which may be adjusted to run the pump for a designated time interval and then shut the pump off for another designated time interval. The timing device switches a relay which in turn switches the high voltage to the pump. Shutting the pump off allows underground oil to seep into the shaft of the well so that it may be pumped out during the next pumping interval. Since wells even in close proximity may have different geological characteristics, the pumping cycle may vary from one well to another.

Oil pumping rigs are by nature large apparatus having a pivotally reciprocating member with heavy counterweights and driving a vertically oriented piston. Like all other machinery, oil pumps are subject to normal wear and tear in the course of operation. Periodic maintainence and repairs are necessarily performed upon the pumps by oil field workers. The workers will often approach the pumping rig at a random point within the pumping cycle, not knowing when the pump will next begin operation. While such work is being performed upon the pump, it has been known for the pump to start-up without warning and thereby cause injury to workers. Due to the size and mass of the pump, a worker may be easily crushed to death if caught underneath the pivoting member. Even when a start-up time is anticipated, the workers may be caught by surprise and not have time to clear the area.

It is therefore an object of the present invention to provide an alarm system for warning workers to clear the area prior to operation of an oil pump.

It is another object of the present invention to provide a system of the aforesaid type which will delay the starting of an oil pump during the duration of the alarm.

It is yet another object of the present invention to provide a system of the aforesaid type which may be over-ridden to facilitate testing of the pump without delay.

SUMMARY OF THE INVENTION

The above and other beneficial object and advantages are accomplished in accordance with the present invention by an electronic system connected to an oil well pump electrical control having a sequence timer and magnetic connector coil relay, said system comprised of:

a) a power supply adapted to convert line voltage current into low voltage direct current, b) current detection means activated by said line voltage current output from said sequence timer and having switching means adapted to control said direct current into said system, c) delay timer means activated by said detection means and adapted to delay electrical activation of said coil relay and said pump, d) a horn pulse generator activated by said delay timer means and adapted to output DC current in a pulsating rhythm, e) a horn driver activated by said horn pulse generator, and adapted output AC line voltage, f) an audible horn activated by said line voltage output from said horn driver, g) a relay driver activated by said delay timer subsequent to said time delay and adapted to output line voltage to said coil relay means, and h) override switching means adapted to circumvent said delay timer and thereby instantaneously active said relay coil means and said pump.

In a preferred embodiment, said pulse generator may have output means to control a visual alarm such as a flashing light.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
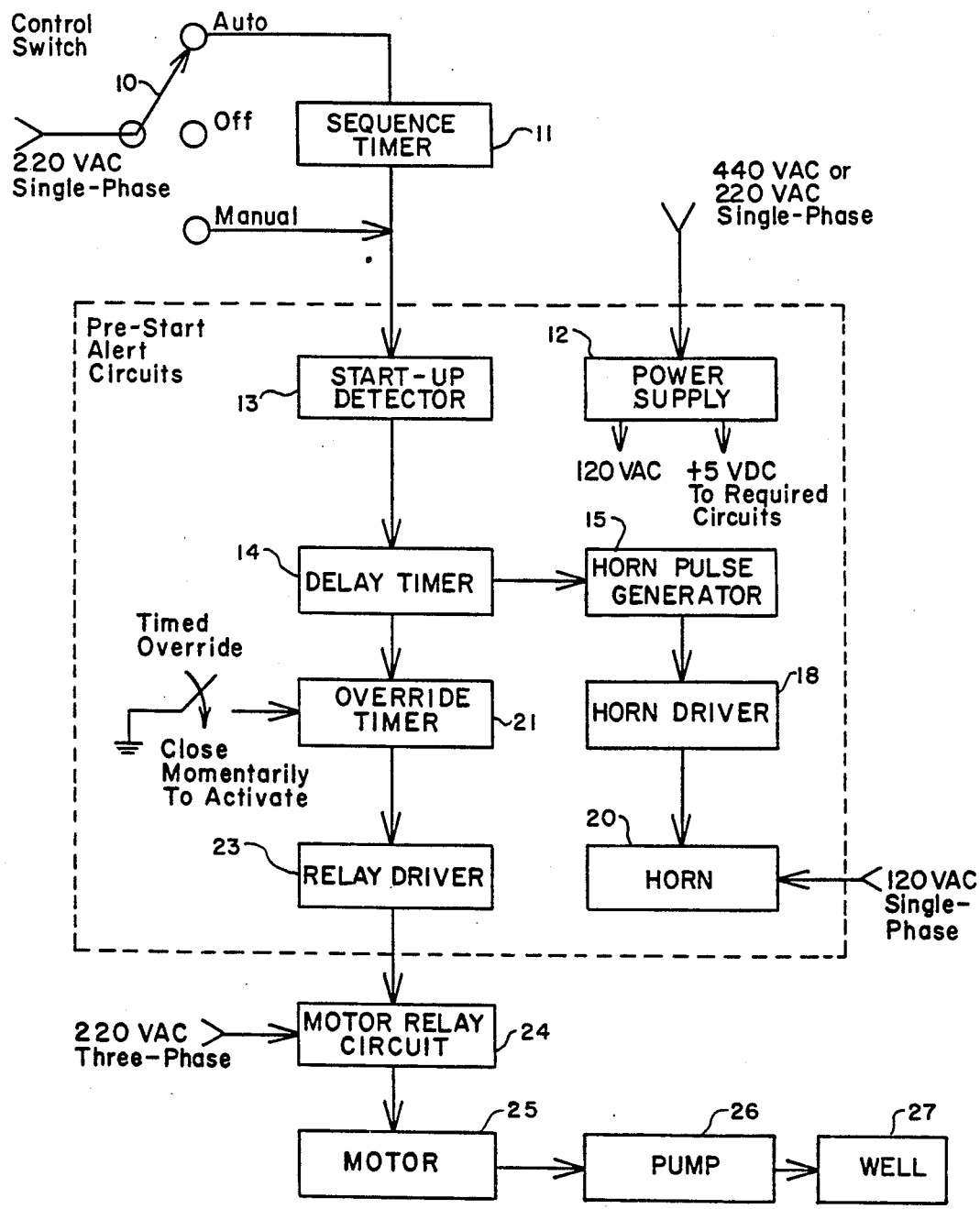
FIG. 1 is a functional block diagram of the system.
Figure 2A:
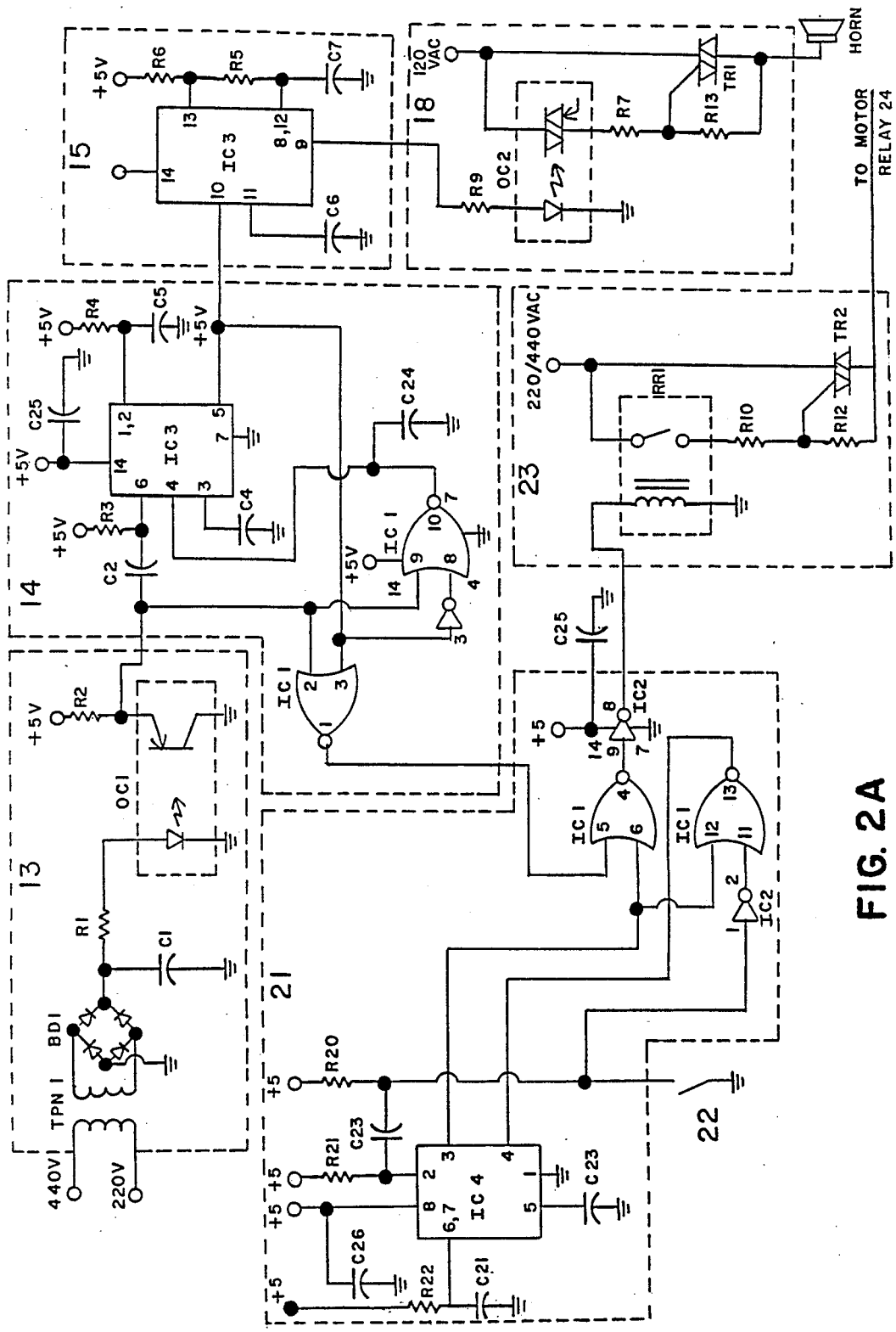
FIG. 2 is a schematic diagram of the system.
Figure 2B:
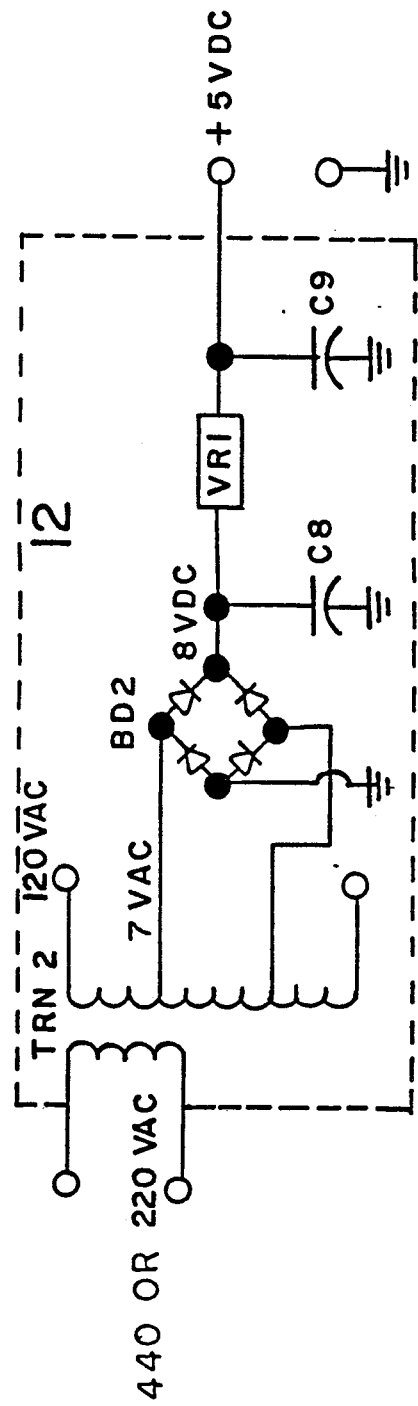

Referring to FIGS. 1 and 2, an embodiment of the apparatus of the present invention is shown in the form of an electrical circuit connected between the line power supply and pumping apparatus. Control switch 10 and sequence timer 11 are typically mounted within a control box located in close proximity to the pump. The present invention would typically be located in an adjacent control box.

Power is delivered to the system of the present invention typically at a 220 VAC or 440 VAC level. Power supply section 12, consists of transformer TRN2 adapted to step the voltage down to a working voltage 7 VAC which is rectified by bridge rectifier BD2 into an 8 VDC output. Output from BD2 is filtered by capacitor C8 and regulated by voltage regulator VR1 to 5 VDC. Capacitor C9 further filters the 5 vdc output to eliminate voltage fluctuations and noise. The +5 vdc output is supplied throughout the system to various components.

Start-up detector 13 is energized by output from sequence timer 11 or from current bypassing sequence timer 11 from switch 10. The input line voltage enters transformer TRN1 and is stepped down. Reached voltage AC output from TRN1 is converted to DC by bridge rectifier BD1 and filtered by capacitor C1. DC current flows through resistor R1, which provides a working load on the circuit, into opto-isolator OC1, typically of the MCT272GI 6 pin DIP type. Current energizes the opto-isolator and flows to ground thereby switching the voltage of the output line from 0 to +5 vdc. Opto-isolator OC1 functions to protect the sensitive electronics from the input line voltage. Output from detector 13 will be +5 vdc when the input line voltage is 0 V and the output will be 0 V when 220 VAC or 440 VAC is input from sequence timer 11. Resistor R2 is connected between +5 vdc and opto-isolator OC1 to provide a working load to ground when the circuit is completed.

Delay timer 14 employs a one half of a LM556N integrated circuit IC3 as a monostable multivibrator. Delay timer 14 has trigger input pin 6 which is normally held at +5 vdc through resistor R3. Pin 6 is connected to the output of opto-isolator OC1 through capacitor C2. When output from OC1 is switched to 0 V, a negative pulse is generated across capacitor C2. The value of the capacitor, which may be 33 uf is chosen to provide a pulse of sufficient duration to trigger the delay timer at pin 6 of IC3. Integrated circuit IC3 receives +5 vdc at pin 14 and is grounded at pin 7. Pin 3 and pin 14 are grounded through capacitors C4 and C25, respectively, to prevent high frequency transients from entering the circuit. Delay timer 14, when activated, immediately triggers an output at pin 5 of +5 vdc. The duration of the delay time determines the duration the output at pin 5. Discharge pin 1 and threshold pin 2 are connected to +5 vdc through resistor R4 and are grounded by capacitor C5. As capacitor C5 is charged up by current supplied through Resistor R4, pins 1 and 2 are held at +5 vdc. When capacitor C5 discharges to ground, pins 1 and 2 drop to 0 V. The time delay (in seconds) is determined by the relationship:

$$time = 1.6(R4)(C5)$$

where R4 is in ohms and C5 is in farads. Typically R4 may have a value of 56 M ohm and C5 may have a value of 4.7 uf. The output from pin 5 will activate horn pulse generator 15 for this duration. Output is also NORed through a portion of 74LS02 integrated circuit IC1 at pin 3 of IC1 to supply an output to override timer 16 and pin 3 of integrated circuit IC1. Output to pin 3 is NORed with current at opto-isolator OC1 at pin 2 of integrated circuit IC1 to deliver an output from pin 1 of IC1. When detector 13 is energized pin 2 of IC1 is grounded. When the output from pin 5 of integrated circuit IC3 drops to 0 v, horn pulse generator 15 will stop operating and pin 3 of IC 1 will also be grounded. When pins 2 and 3 of IC1 are both grounded, a resulting output of +5 vdc will be output from pin 1 of IC1. Conversely when either pin 2 or pin 3 receives +5 vdc during horn pulse generator 15's operation or from de-energization of detector 13, the output from pin 1 of IC1 will be 0 v. Integrated circuit IC3 is reset by +5 vdc at pin 4 provided by additional logic within the circuit.

Horn pulse generator 15 encompasses the other half of LM556N integrated circuit IC3 in operation as an astable multivibrator. This circuit will generate a pulse output to horn driver 18. Current is directed to the circuit from the output of IC3, pin 5 and activates horn pulse generator 15 at IC3, pin 10, which is the reset function pin of IC 3 timer. When +5 vdc enters pin 10, the generator outputs a pulsating +5 vdc output at IC3, pin 9. When pin 10 is set to 0 V, there is no output to horn driver 18. Pin 13 of IC3 is the discharge function of the circuit and is connected to +5 vdc through resistor R6, which may have a value of 1 k ohm. Pins 8 and 12 are the trigger and threshold functions, respectively, and are both connected to discharge pin 13 through resistor R5. Pins 8 and 12 receive +5 volts through resistors R5 and R6, and are grounded through capacitor C7.

The pulse generated will be of constant duration at a constant predetermined frequency. The output at IC3, pin 9 will be alternate between +5 vdc and 0 V, to provide a pulsating horn sound. The pulse duration (t) in seconds is determined by the relationship:

$$t = 0.693(R5 + R6)C7$$

The frequency (f) of the pulse is determined by the relationship:

$$f = \frac{1.44}{(R6 + 2*R5)C7} \text{ hertz}$$

where R5 and R6 are values in ohms, and C7 is in farads. Typical values of R5 and R6 may be 6.6 M ohms and 1 K ohm, respectively, and C7 may be 4.7 uf.

False triggering of the circuit is accomplished by the connection to ground of pins 11 and 14 by capacitors C6 and C25, respectively. This prevents high frequency transients from entering the circuit.

Horn driver 18 receives a +5 vdc pulsating current flow from pin 9 of IC3 through resistor R9 when horn pulse generator 15 is energized. Current enters opto-isolator triac driver OC2 and continues to ground, thereby completing the +5 vdc circuit and allowing 120 vac line current to flow through biasing resistors R7 and R13. The 120 vac current activates triac switch TR1 which delivers current to horn 20. Horn 20 will sound intermittantly for said duration and frequency. Horn 20 will be silenced by operation of delay timer 14 at the completion of time (t). Opto-isolator triac driver OC2, typically of the Q8006R5 variety, serves to protect the sensitive TTL logic circuits from the high voltage required to drive the horn.

Override timer 21 encompasses a LM555 timer integrated circuit IC4 operating as a monostable multivibrator. The operation of this timer ignores the status of delay timer and horn 20 and is used to run the pump without delay and horn functions. Integrated circuit IC4 receives +5 vdc from power supply 12 at pin 8 of IC4 and is grounded at pin 1 of IC4. Pins 5 and 8 are grounded through capacitors C22 and C26, respectively, to provide false triggering, thereby preventing high frequency transients from entering the circuit. Threshold pin 6 and discharge pin 7 of IC4 receive +5 vdc through R22 and are grounded through capacitor C21. The duration of pump operation in the override mode is determined by the relationship:

$$time = 1.6(R22)(C21) \text{ seconds}$$

where R22 is measured in ohms and C21 is measured in farads. R22 and C21 may have values of 12 M ohms and 4.7 uf, respectively.

The timer is triggered into operation by a negative pulse of sufficient duration on pin 2 of IC4. Pin 2 is held normally at +5 vdc by current through resistor R21. The pin is grounded through capacitor C23. When override switch 22 is closed, the discharge of voltage by capacitor C23 creates the triggering pulse on pin 2 of IC4. The value of C23 is chosen to provide a sufficient pulse duration for triggering IC4. When triggered, integrated circuit IC4 outputs +5 vdc from pin 3. Output from pin 3 of IC4 is NORed at pin 6 of integrated circuit IC1 with output from pin 1 of IC1 at pin 5 of IC1. The resulting signal is output from pin 4 of IC1. When either pin 5 or 6 of IC1 is +5 vdc, the resulting output is 0 V. This will occur from the activation of override timer 21 or delay timer 14. When both pins 5 and 6 are grounded, the output from pin 4 will be +5 vdc. This condition occurs when the system is not energized by override 21 or detector 14 or when horn 20 is sounding.

Integrated circuit IC2 is typically a 74LS06 hexidecimal converter. IC2 receives +5 vdc at pin 14 and is grounded at pin 7. It is grounded at pin 8 through capacitor C25 to provide false triggering. The output signal from pin 4 of IC1 is inverted from 0 volts input at pin 9 of IC2 to +5 vdc output at pin 8 of IC2 when the override or delay timers are energized. This +5 vdc output drives relay driver 23. Additional logic is provided to reset override timer IC4 at pin 4. When override switch 22 is opened, pin 1 of IC2 is set to +5 vdc through resistor R20. The +5 vdc is inverted by IC2 to output 0 volts from pin 2 of IC2. Output from pin 2 of IC2 is NORed at pin 11 of IC1 with the output from pin 3 of IC4. When both pin 11 and pin 12 are set at 0 volts, pin 13 of IC1 will output +5 vdc and thereby reset IC4 at pin 4. This condition exists when override timer switch 22 is opened.

Relay driver 23 receives output from pin 8 of IC2 when either the override timer or the delay timer outputs are energized. The +5 vdc energizes the coil of relay RR1 which switches line voltage up through triac TR2, which is biased by resistors 10 and 12, typically 1 k ohm and 10 k ohm, respectively, and outputs line voltage to the motor relay 24 which in turn energizes the pump motor 25. When current to the system is shut off, the relay input drops to 0 volts and the current to the pump motor is arrested.

While particular examples of the present invention have been shown and described, it is apparent that changes and modifications may be made therein without departing from the invention in its broadest aspects.

The aim of the appended claims, therefore, is to cover all such changes and modifications as fall within the true spirit and scope of the invention.

Having thus described my invention, what is claimed is:

1. A time delay safety system for apparatus periodically activated by electrical current through a sequence timer, and having moving parts of a hazardous nature, said system comprising:
   a) a power supply adapted to convert line voltage alternating current into a regulated low voltage direct current,
   b) current detection means activated by line voltage supplied from said sequence timer,
   c) delay timer means activated by said current detection means and adapted to delay electrical activation of said apparatus,
   d) a horn pulse generator activated by said delay timer means and adapted to produce a current output for a time interval preceding activation of said apparatus, and
   e) a horn adapted to sound in response to the current output from said horn pulse generator.

2. The safety system of claim 1 further comprising override switching means adapted to circumvent said delay timer means and thereby instantaneously activate said apparatus.

3. The safety system of claim 1 wherein said apparatus is a pump.

4. The safety system of claim 3 wherein said pump services an oil-producing well.

* * * * *